United States Patent
Eszterle et al.

(10) Patent No.: US 11,845,339 B2
(45) Date of Patent: Dec. 19, 2023

(54) TRANSMISSION FOR A HYBRID DRIVE ASSEMBLY, HYBRID DRIVE ASSEMBLY, VEHICLE, AND METHOD FOR OPERATING THE HYBRID DRIVE ASSEMBLY

(71) Applicant: Robert Bosch GmbH, Stuttgart (DE)

(72) Inventors: Dominik Eszterle, Stuttgart (DE); Rolf Lucius Dempel, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 17/616,007

(22) PCT Filed: May 5, 2020

(86) PCT No.: PCT/EP2020/062395
§ 371 (c)(1),
(2) Date: Dec. 2, 2021

(87) PCT Pub. No.: WO2020/249312
PCT Pub. Date: Dec. 17, 2020

(65) Prior Publication Data
US 2022/0324316 A1 Oct. 13, 2022

(30) Foreign Application Priority Data

Jun. 13, 2019 (DE) ...................... 10 2019 208 599.7

(51) Int. Cl.
*F16H 3/00* (2006.01)
*B60K 6/547* (2007.10)
(Continued)

(52) U.S. Cl.
CPC ................ *B60K 6/547* (2013.01); *B60K 6/36* (2013.01); *B60K 6/48* (2013.01); *F16H 3/006* (2013.01);
(Continued)

(58) Field of Classification Search
CPC . B60K 6/547; B60K 6/36; B60K 6/48; B60K 2006/4825; B60K 2006/4833;
(Continued)

(56) References Cited

U.S. PATENT DOCUMENTS

2008/0064550 A1\* 3/2008 Holmes ................... F16H 3/725
475/5
2010/0062891 A1\* 3/2010 Ekonen .............. B60K 23/0808
74/405
(Continued)

FOREIGN PATENT DOCUMENTS

DE   10 2012 220 663 A1   5/2014
DE   10 2012 220 674 A1   5/2014
(Continued)

OTHER PUBLICATIONS

Machine translation of DE 102012220663 A1 (Year: 2014).\*
(Continued)

*Primary Examiner* — Jacob S. Scott
*Assistant Examiner* — Farhana Pervin
(74) *Attorney, Agent, or Firm* — Maginot, Moore & Beck LLP (57) ABSTRACT

A transmission for a hybrid drive assembly includes an input shaft, an output shaft, a first transmission shaft, a second transmission shaft, a third transmission shaft, first, second, and third shift elements, a first spur gear set, a second spur gear set, and a third spur gear set. The input shaft can be coupled to the first transmission shaft by the first shift element, the first transmission shaft is coupled to the first spur gear set, the first spur gear set can be coupled to the second transmission shaft by the second shift element, the second transmission shaft is coupled to the second spur gear set, and the second spur gear set is coupled to the third transmission shaft. The third transmission shaft is coupled to the third spur gear set and the third spur gear set can be coupled to the output shaft by the third shift element.

20 Claims, 4 Drawing Sheets

(51) Int. Cl.
   *B60K 6/36* (2007.10)
   *B60K 6/48* (2007.10)
   *F16H 3/08* (2006.01)

(52) U.S. Cl.
   CPC ............... *B60K 2006/4825* (2013.01); *B60K 2006/4833* (2013.01); *F16H 2003/0807* (2013.01); *F16H 2200/2051* (2013.01)

(58) Field of Classification Search
   CPC ............ F16H 3/006; F16H 2003/0807; F16H 2200/2051; F16H 2003/0933; F16H 2200/0052; F16H 2003/0803
   See application file for complete search history.

(56) References Cited

U.S. PATENT DOCUMENTS

| | | | | |
|---|---|---|---|---|
| 2010/0257962 | A1* | 10/2010 | Recker | F16H 3/006 74/331 |
| 2017/0096137 | A1* | 4/2017 | Toyama | F16H 61/0403 |
| 2017/0261099 | A1* | 9/2017 | Hathaway | F16H 61/0213 |
| 2021/0023931 | A1* | 1/2021 | Hwang | F16H 3/085 |
| 2021/0284006 | A1* | 9/2021 | Park | B60K 6/48 |
| 2022/0136589 | A1* | 5/2022 | Beck | F16H 3/089 74/325 |
| 2022/0185095 | A1* | 6/2022 | Beck | B60K 6/44 |

FOREIGN PATENT DOCUMENTS

| | | |
|---|---|---|
| DE | 10 2013 019 118 A1 | 5/2015 |
| DE | 10 2015 204 600 A1 | 9/2016 |
| DE | 10 2016 007 408 A1 | 12/2017 |
| DE | 10 2016 212 221 A1 | 1/2018 |
| DE | 10 2016 220 701 A1 | 4/2018 |
| WO | 2010/009943 A1 | 1/2010 |

OTHER PUBLICATIONS

International Search Report corresponding to PCT Application No. PCT/EP2020/062395, dated Aug. 10, 2020 (German and English language document) (6 pages).

\* cited by examiner

FIG. 1

|    | SE1 | SE2 | SE3 | SE4 | SE5 | SE6 | SE7 | SE8 | i      |
|----|-----|-----|-----|-----|-----|-----|-----|-----|--------|
| G1 | X   | X   | X   |     |     |     |     |     | -3.661 |
| G2 |     | (X) | X   | X   |     |     |     |     | -2.551 |
| G3 | X   |     | (X) |     |     |     |     |     | -1.667 |
| G4 |     |     |     | X   | X   |     |     |     | -1.161 |
| G5 | X   |     |     |     | (X) | X   |     |     | -0.873 |
| G6 |     | X   |     | X   |     | (X) | X   |     | -0.609 |
| R  | X   |     | X   |     |     |     | X   | X   | 3.051  |
| E1 |     | X   | X   |     |     |     |     |     | -3.661 |
| E2 |     |     | X   |     |     |     |     | X   | 3.051  |
| E3 |     |     |     |     | X   |     |     | (X) | -1.667 |
| E4 |     |     |     |     |     | X   |     | X   | 1.389  |
| E5 |     |     |     |     |     |     | X   | (X) | -0.873 |
| CH |     | X   |     | X   |     |     |     |     | 3.010  |

TRANSMISSION FOR A HYBRID DRIVE ASSEMBLY, HYBRID DRIVE ASSEMBLY, VEHICLE, AND METHOD FOR OPERATING THE HYBRID DRIVE ASSEMBLY

This application is a 35 U.S.C. § 371 National Stage Application of PCT/EP2020/062395, filed on May 5, 2020, which claims the benefit of priority to Ser. No. DE 10 2019 208 599.7, filed on Jun. 13, 2019 in Germany, the disclosures of which are incorporated herein by reference in their entirety.

The disclosure relates to a transmission for a hybrid drive assembly. The disclosure furthermore relates to a hybrid drive assembly having a transmission, to a vehicle having a hybrid drive assembly and to a method for operating the hybrid drive assembly, as well as a computer program and a machine-readable storage medium.

BACKGROUND

Transmissions for hybrid drive assemblies are known from the prior art. WO2010/009943 A1, for example, shows a twin-clutch transmission that makes it possible to operate a hybrid vehicle by means of an internal combustion engine, by means of an electric motor and jointly by means of both drive units. Transmissions of this type are complex, heavy and expensive. There is a need for transmission topologies with reduced mechanical complexity, reduced space requirements and reduced weight.

In the text which follows, the term "coupled" or "coupled to" is used in the sense of a fixed connection. In contrast, the term "can be coupled" within the scope of the present description includes both fixed and selectable connections. If a selectable connection is meant in a specific instance, then, as a rule, the corresponding shift element, in particular a brake or a clutch, is explicitly indicated. In contrast, if a fixed, rigid or rotational connection is meant in a specific instance, the term "coupled" or "coupled to" is generally used, and the term "can be coupled" is not. The use of the term "can be coupled" without specifying a particular shift element thus indicates the intention to include both cases. This distinction is made solely for the sake of better comprehensibility and, in particular, to clarify where the provision of a selectable connection, rather than a fixed connection or coupling, which is generally easier to implement, is absolutely necessary. The above definition of the term "coupled" or "coupled to" should therefore not be interpreted so narrowly that clutches inserted arbitrarily for bypassing purposes would fall outside its literal sense.

SUMMARY

A transmission for a hybrid drive assembly is provided, which can be coupled to two drive units, having an input shaft and an output shaft, and at least one first transmission shaft, a second transmission shaft, and a third transmission shaft, at least one first shift element, one second shift element, and one third shift element, at least one first spur gear set, one second spur gear set, and one third spur gear set, wherein the input shaft can be coupled to the first transmission shaft by means of the first shift element, the first transmission shaft is coupled to the first spur gear set, the first spur gear set can be coupled to the second transmission shaft by means of the second shift element, the second transmission shaft is coupled to the second spur gear set, the second spur gear set is coupled to the third transmission shaft, the third transmission shaft is coupled to the third spur gear set, and the third spur gear set can be coupled to the output shaft by means of the third shift element.

A transmission for a hybrid drive assembly is provided. For the operation of the hybrid drive assembly, two drive units can be coupled to the transmission. The transmission comprises an input shaft and an output shaft as well as at least one first, one second and one third transmission shaft. Furthermore, the transmission comprises at least one first, one second and one third shift element as well as at least one first, one second and one third spur gear set. A spur gear set comprises at least two spur gears, which mesh and transmit a torque. In this case, the first spur gear receives a torque, from a transmission shaft for example, and the second spur gear of the spur gear set transmits the torque transmitted from the first spur gear to the second spur gear, to a further spur gear or to a further transmission shaft, for example.

The input shaft can be connected to or disconnected from the first transmission shaft by closing or opening the first shift element. Furthermore, the first transmission shaft is fixedly coupled to the first spur gear set and is thus connected thereto for conjoint rotation. In the context of the description, a coupling is to be understood as a connection which is designed to be rigid, e.g. in one piece, by means of a shaft for example, or with a fixed transmission ratio or gear stage.

The first spur gear set can also be connected to or disconnected from the second transmission shaft by closing and opening the second shift element, wherein the second transmission shaft is fixedly coupled to the second spur gear set and is thus connected thereto for conjoint rotation. The second spur gear set is fixedly coupled to the third spur gear set by means of the third transmission shaft and is thus connected thereto for conjoint rotation.

The output shaft is connected to the third spur gear set in a manner such that it can be coupled thereto by means of the third shift element. In particular, the output shaft can be coupled to an output. The output is, in particular, a shaft or an axle which transmits the movement of the output shaft to the mechanical drive train of a vehicle, for example to a differential or to a drive wheel. A transmission is advantageously provided which transmits the rotational speed and the torque which is applied to the input shaft to the output shaft in accordance with the transmission ratios in the transmission when the first and/or second and/or third shift element are/is closed. When the first, second and third shift elements are simultaneously closed, a first transmission ratio is obtained between the input shaft and the output shaft. In particular, the transmission according to the disclosure is particularly suitable for a drive system which is operated with a voltage of 48 V, as well as for drive systems which use a higher voltage than 48 V.

In another embodiment, the transmission comprises a fourth shift element, which is designed to disconnect or connect the input shaft from or to the third transmission shaft.

A fourth shift element is provided for the transmission. The input shaft can be connected to or disconnected from the third transmission shaft by closing or opening the fourth shift element. In particular, the input shaft can be coupled to, i.e. connected to or disconnected from, the second spur gear set and/or to the third spur gear set by means of the fourth shift element and the third transmission shaft. With the above-described topology of the transmission with the first, second, third and fourth shift elements, it is advantageously possible to set further operating modes in addition to those already mentioned. Thus, for example, when the third and fourth shift elements are closed and the first and second shift elements are open, a further transmission ratio between the input shaft and the output shaft, a second transmission ratio in the transmission, is obtained.

In another embodiment, the transmission comprises a fifth shift element, which is designed to disconnect or connect the first spur gear set from or to the output shaft.

A fifth shift element is provided for the transmission. The first spur gear set can be connected to or disconnected from the output shaft by closing or opening the fifth shift element. With the above-described topology of the transmission with the first, second, third, fourth and fifth shift elements, it is advantageously possible to set further operating modes in addition to those already mentioned. Thus, for example, when the first and fifth shift elements are closed and the second, third and fourth shift elements are open, a further transmission ratio between the input shaft and the output shaft, a third transmission ratio in the transmission, is obtained.

In another embodiment, the transmission comprises a sixth shift element, which is designed to disconnect or connect the second transmission shaft from or to the output shaft. In particular, the second spur gear set is connected to the output shaft in a manner such that it can be coupled thereto by means of the sixth shift element and via the second transmission shaft.

A sixth shift element is provided for the transmission. The second transmission shaft, and also the second spur gear set, in particular via the second transmission shaft, can be connected to or disconnected from the output shaft by closing or opening the sixth shift element.

With the above-described topology of the transmission with the first, second, third, fourth, fifth and sixth shift elements, it is advantageously possible to set further operating modes in addition to those already mentioned. Thus, for example, when the fourth and sixth shift elements are closed and the first, second, third and fifth shift elements are open, a further transmission ratio between the input shaft and the output shaft, a fourth transmission ratio in the transmission, is obtained.

In another embodiment, the transmission comprises a fourth spur gear set and a seventh shift element, which is designed to disconnect or connect the first spur gear set from or to the fourth spur gear set, wherein the fourth spur gear set is coupled to the output shaft.

A fourth spur gear set and a seventh shift element are provided for the transmission. The fourth spur gear set can be connected to or disconnected from the first spur gear set by closing or opening the seventh shift element. The fourth spur gear set is furthermore fixedly connected to the output shaft and is thus coupled thereto for conjoint rotation. With the above-described topology of the transmission with the first, second, third, fourth, fifth, sixth and seventh shift elements, it is advantageously possible to set further operating modes in addition to those already mentioned. Thus, for example, when the first and seventh shift elements are closed and the second, third, fourth, fifth and sixth shift elements are open, a fifth transmission ratio between the input shaft and the output shaft is obtained. When the second, fourth and seventh shift elements are closed and the first, third, fifth and sixth shift elements are open, a further transmission ratio between the input shaft and the output shaft, a sixth transmission ratio in the transmission, is obtained.

In another embodiment, the transmission comprises a fifth spur gear set and an eighth shift element, which is designed to disconnect or connect the first spur gear set from or to the fifth spur gear set, wherein the fifth spur gear set is coupled to the second transmission shaft.

A fifth spur gear set and an eighth shift element are provided for the transmission. The fifth spur gear set can be connected to or disconnected from the first spur gear set by closing or opening the eighth shift element and can thus also be coupled to the first transmission shaft via the first spur gear set. The fifth spur gear set is furthermore fixedly connected to the second transmission shaft and is thus coupled thereto for conjoint rotation. In particular, the fifth spur gear set is also fixedly connected to the second spur gear set by means of the second transmission shaft. In particular, the fifth spur gear set comprises three spur gears, thus making it possible, with the aid of the fifth spur gear set, to obtain a transmission ratio between the input shaft and the output shaft in which the output shaft rotates in the opposite direction to that in the other transmission ratios, and thus a reverse gear is achieved.

With the above-described topology of the transmission with the first, second, third, fourth, fifth, sixth, seventh and eighth shift elements, it is advantageously possible to set further operating modes in addition to those already mentioned. Thus, for example, when the first, third and eighth shift elements are closed and the second, fourth, fifth, sixth and seventh shift elements are open, a seventh transmission ratio between the input shaft and the output shaft, a transmission ratio in the transmission corresponding to a reverse gear, is obtained.

In another embodiment, the first and/or the fourth shift element (SE1, SE4) comprise/s a clutch, in particular a friction clutch, and/or the second, the third, the fifth, the sixth, the seventh and/or the eighth shift element (SE3, SE4, SE5, SE6) comprise/s a claw clutch or a friction clutch. Possibilities for a controllable connection of the components of the transmission are advantageously made available.

In another embodiment, a first drive unit, in particular an internal combustion engine, can be coupled to the input shaft and/or a second drive unit, in particular an electric machine, is coupled to the first spur gear set or the first transmission shaft.

On the input side, the first drive unit can be coupled to the input shaft. The second drive unit is coupled to the first spur gear set or the first transmission shaft and is thus fixedly connected thereto. For a generator mode of the second drive unit, e.g. an electric machine, for charging a battery for example, the first drive unit or the internal combustion engine can advantageously be connected to the electric machine by closing the second and fourth shift elements. Since, in this case, both drive units are uncoupled from the output shaft and thus no torque is transmitted to the output shaft, this charging can take place, for example, when the output shaft is stationary, that is to say, for example, when a vehicle is stationary (stationary charging). When, for example, the output shaft is stationary, direct transfer of the rotational energy of the first drive unit to the second drive unit or vice versa, e.g. to start an internal combustion engine, is made possible.

When the first and fourth shift elements are open, the input shaft, and thus the first drive unit, are uncoupled from the output shaft. When the second and third shift elements are additionally closed, the second drive unit is connected to the output shaft via a first transmission ratio, and therefore the output shaft can be driven only by means of the second drive unit. A second and third transmission ratio between the second drive unit and the output shaft is obtained when the third and eighth shift elements are closed or when the fifth shift element is closed. When the sixth and eighth shift elements are closed, a fourth transmission ratio is obtained, and when the seventh shift element is closed, a fifth transmission ratio is obtained between the second drive unit and the output shaft. The other shift elements are respectively open in the various transmission ratios.

By means of closing, in particular controlled closing, of the first shift element or the fourth shift element, it is possible, from driving by means of the second drive unit, to drive and, for example, start the first drive unit in the first, the second, the third, the fourth or the fifth transmission ratio if the first drive unit is an internal combustion engine.

There is also the possibility that the first drive unit is configured as an electric machine, for example, and the second drive unit is configured as an internal combustion engine, for example. In such a configuration, other functionalities and operating modes for the interaction of the components, which are not described in detail here, can be obtained by means of the transmission.

In another embodiment, the transmission ratios of the transmission are changed without any interruption in the tractive effort.

The changing of the transmission ratios of the transmission, in particular shifting into another gear or into another operating mode of the transmission, take place without any interruption in the tractive effort if, in particular for the change from one operating mode of the transmission to another, one of the shift elements retains its state, a second of the shift elements is transferred from a closed state to an open state, and a third of the shift elements is transferred from an open state to a closed state. A transmission is advantageously provided in which the changing of the gear stages is made possible without any interruption in the tractive effort.

In another embodiment, the transmission comprises a controller for controlling at least one of the shift elements in accordance with a specified operating input signal.

A controller is provided which controls at least one of the shift elements in accordance with a specified operating input signal, e.g. a requested torque, a specified rotational speed or a certain operating point of the drive units. Said parameters of the operating input signal may be related to the output shaft of the transmission, to the input shaft or to the shafts to be connected to the drive units. Control of the transmission is advantageously made possible.

The disclosure furthermore relates to a hybrid drive assembly having a transmission, wherein the hybrid drive assembly comprises a second drive unit and/or a pulse inverter, an electrical energy source or a first drive unit.

A hybrid drive assembly having a transmission as described above is provided. The hybrid drive assembly comprises a second drive unit. In particular, the hybrid drive assembly comprises a pulse inverter, an electrical energy source and/or a first drive unit. In particular, the second drive unit is coupled or connected to the first spur gear set or the first transmission shaft. The pulse inverter is provided, in particular, for supplying the second drive unit, in particular an electric machine. For this purpose, it converts, in particular, the electrical energy of an electrical energy source, for example a battery and/or a fuel cell. In particular, the first drive unit is coupled or connected to the input shaft. A hybrid drive assembly which is designed for use in a vehicle is advantageously provided.

Furthermore, the disclosure comprises a vehicle having a hybrid drive assembly which has been described. A vehicle which comprises a hybrid drive assembly is advantageously provided.

Furthermore, the disclosure comprises a method for operating a hybrid drive assembly having a transmission. The method comprises the following steps: determining an operating input signal;

actuation of at least one of the shift elements to set the functionality of the transmission in accordance with the operating input signal (BV).

A method for operating a hybrid drive assembly having a transmission is provided. In this case, an operating input signal is determined. At least one of the shift elements is closed or opened to set the functionality of the transmission or a corresponding operating mode in accordance with the operating input signal. The operating input signal is specified in accordance with an operating strategy, a driver command or accelerator pedal, a battery management system or other systems available, e.g. in a vehicle. In accordance with this operating input signal, the shift elements are actuated to set the corresponding functionality or the operating mode of the transmission, in particular the clutches or brakes are engaged or disengaged. The functionality of the transmission or the operating mode are, in particular, the different transmission ratios of the various gear stages, or the various modes or operating modes, for example a generator mode of the second drive unit with the output shaft at a standstill. A method for operating the hybrid drive assembly is advantageously provided.

The disclosure furthermore relates to a computer program which is designed to execute the method described.

The disclosure furthermore relates to a machine-readable storage medium on which the computer program described is stored.

It is self-evident that the features, properties and advantages of the transmission apply or can be applied in corresponding fashion to the hybrid drive assembly, the vehicle or the method and vice versa. Further features and advantages of embodiments of the disclosure will be found in the following description with reference to the accompanying drawings.

BRIEF DESCRIPTION OF THE DRAWINGS

The disclosure will be explained in greater detail below with reference to a number of figures, of which.

DETAILED DESCRIPTION

Figure 1:
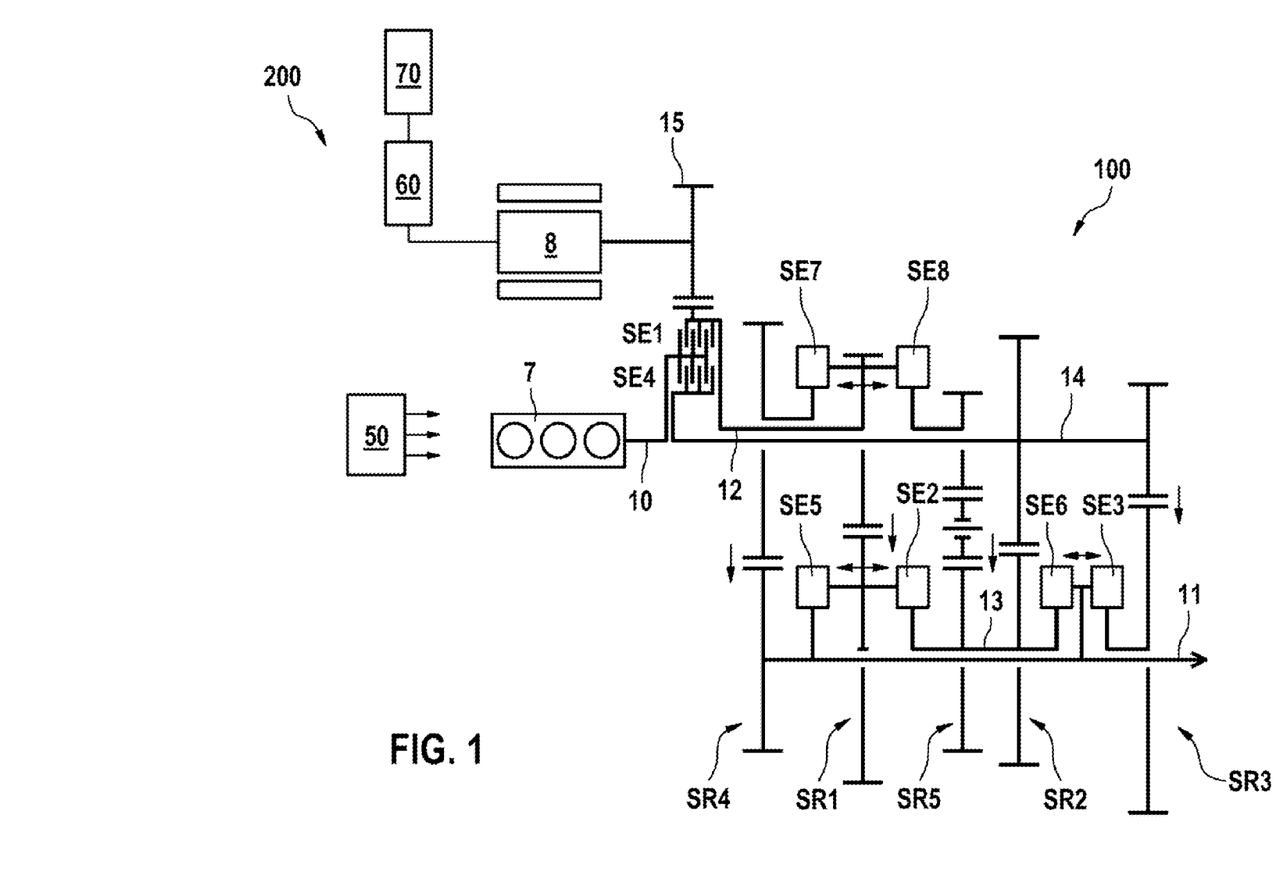
FIG. 1: shows a schematic illustration of the hybrid drive train assembly with a transmission.

FIG. 1 shows a hybrid drive train assembly 200 having a first drive unit 7, in particular an internal combustion engine, and a second drive unit 8, in particular an electric machine, and a transmission 100. In particular, the hybrid drive train assembly comprises a pulse inverter 60 for supplying the second drive unit 8 with electrical energy. Furthermore, the hybrid drive train assembly 200 comprises, in particular, an electrical energy source 70, which is connected to the pulse inverter 60. The transmission 100 comprises the input shaft 10 and the output shaft 11, and at least one first transmission shaft 12, a second transmission shaft 13, and a third transmission shaft 14. The transmission 100 furthermore comprises at least one first spur gear set SR1, one second spur gear set SR2, and one third spur gear set SR3. A spur gear set comprises at least two spur gears, which mesh and transmit a torque. In this case, the first spur gear receives a torque, from a transmission shaft for example, and the second spur gear of the spur gear set transmits the torque transmitted from the first spur gear to the second spur gear, to a further spur gear or to a further transmission shaft, for example. The transmission 100 furthermore comprises a first shift element SE1 and a second shift element SE2, and a third shift element SE3. The first shift element SE1, in particular a friction clutch, is designed to connect or disconnect the input shaft 10 to or from the first transmission shaft 12. The first transmission shaft 12, in turn, is coupled to the first spur gear set SR1 and is thus connected thereto for conjoint rotation. The second shift element SE2, in particular a claw clutch, is designed to connect or disconnect the first spur gear set SR1 to or from the second transmission shaft 13. The second transmission shaft 13 is coupled to the second spur gear set SR2 and is thus connected thereto for conjoint rotation. Furthermore, the second spur gear set SR2 is coupled to the third spur gear set SR3 via the third transmission shaft 14 and is connected thereto for conjoint rotation. The third shift element SE3, in particular a claw clutch, is designed to connect or disconnect the third spur gear set SR3 to or from the output shaft 11. Furthermore, the transmission 100 can have a fourth shift element SE4, a fifth shift element SE5 and a sixth shift element SE6. The fourth shift element SE4, in particular a friction clutch, is designed to connect or disconnect the input shaft 10 to or from the third transmission shaft 14. The fifth shift element SE5, in particular a claw clutch, is designed to connect or disconnect the first spur gear set SR1 to or from the output shaft. In particular, the second and fifth shift elements SE2, SE5 can be designed as a double claw clutch or double synchronizer unit. The sixth shift element SE6, in particular a claw clutch, is designed to connect or disconnect the second transmission shaft 13, and also, in particular via the second transmission shaft 13, the second spur gear set SR2, to or from the output shaft. In particular, the third and sixth shift elements SE3, SE6 can be designed as a double claw clutch. Furthermore, the transmission 100 can have a fourth spur gear set SR4 and a seventh shift element SE7 and/or a fifth spur gear set SR5 and an eighth shift element SE8. The seventh shift element SE7, in particular a claw clutch, is designed to connect or disconnect the first spur gear set SR1 to or from the fourth spur gear set SR4. The fourth spur gear set SR4 is coupled to the output shaft 11 and is thus connected thereto for conjoint rotation. The eighth shift element SE8, in particular a claw clutch, is designed to connect or disconnect the first spur gear set SR1 to or from the fifth spur gear set SR5. The fifth spur gear set SR5 is coupled to the second transmission shaft 13 and is thus connected thereto for conjoint rotation. In particular, the seventh and eighth shift elements SE7, SE8 can be designed as a double claw clutch.

The transmission is furthermore designed to be coupled or connected to a first drive unit via the input shaft 10 for operation. In this regard, FIG. 1 illustrates that the shaft of the drive unit 7 is connected to the input shaft 10. For the operation of the transmission 100 as illustrated in FIG. 1, the second drive unit 8, in particular an electric machine, is coupled to the first transmission shaft 12 or to the first spur gear set SR1, in particular via a further spur gear set 15, and is thus connected thereto for conjoint rotation. To optimize the transmission ratios, the output shaft 11 is connected, e.g. via an output, in particular a spur gear set, to a differential for example, via which the movements are transmitted to the wheels 310. For control of the shift elements, a controller 50 is provided which carries out the method for operating the hybrid drive assembly with the transmission. For reasons of clarity, the control lines between the controller 50 and the individual shift elements SE1 . . . SE8 are shown only as arrows and are not shown in full. Communication between the shift elements SE1 . . . SE8 and the device can take place either by means of the control lines or by means of a bus system or wirelessly.

Figure 2:
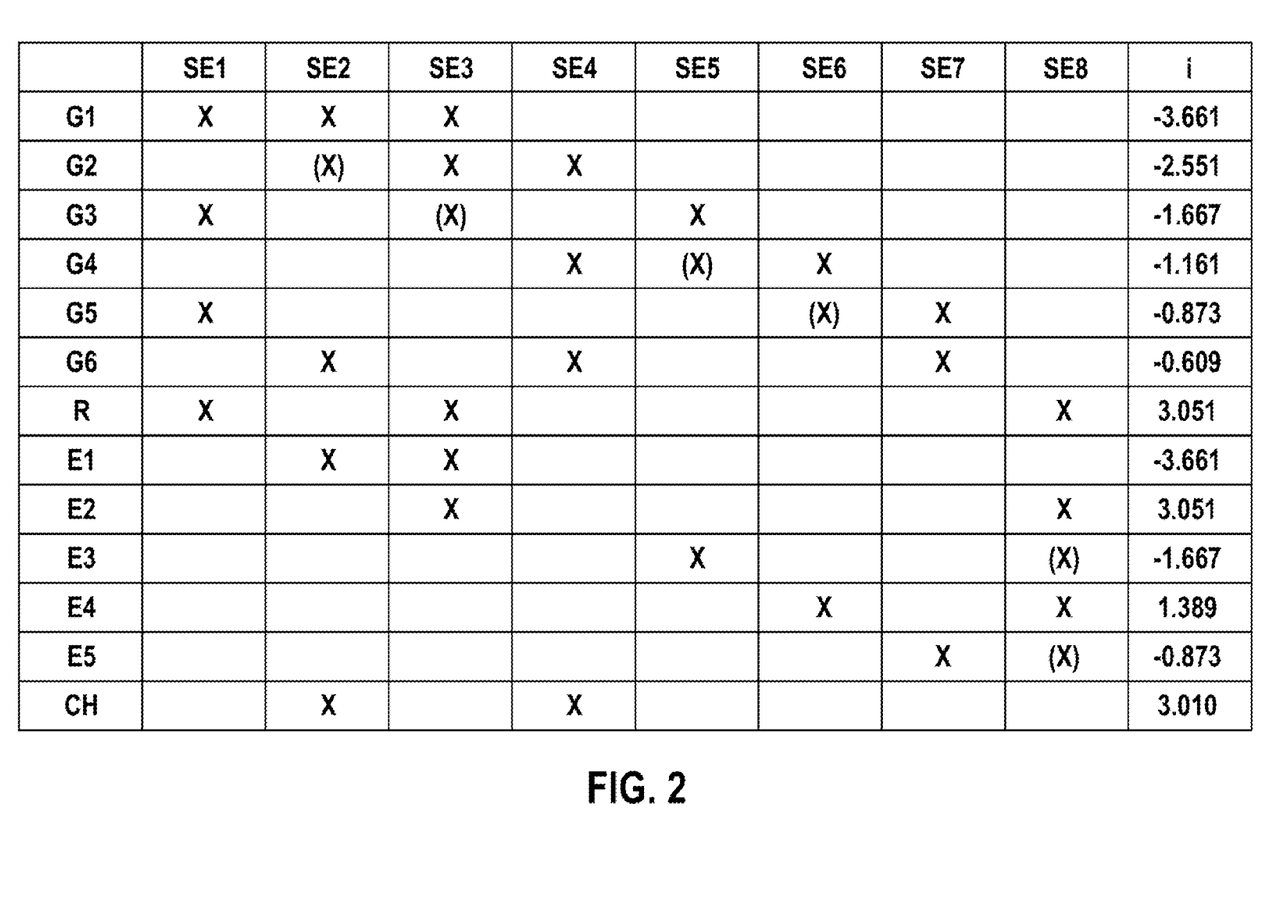
FIG. 2: shows a shift matrix of the transmission.

FIG. 2 shows a shift matrix of the transmission. In the columns, the individual shift elements SE1 . . . SE8 are indicated, and in the last column, by way of example, an approximate transmission ratio resulting between one of the drive units and the output shaft is indicated. The rows indicate the different gear stages, gears or operating modes of the transmission. The shift matrix shows by means of crosses which of the shift elements must be activated in order for the corresponding gear or operating mode to be set. In this context, activation of the shift elements means, in particular, that a clutch is closed or a brake is actuated, such that a force can be transmitted from one shaft to another shaft via the clutch or a force can be transmitted to a fixed point, in particular the transmission housing, by means of the brake. Crosses placed in parentheses designate shift elements which can be activated optionally. This means that the closed shift element is not required for the transmission ratio of the respective transmission gear. The shift element does not transmit any force. However, the activation of these shift elements creates the possibility of changing over to another transmission gear without any interruption in the tractive effort. It can be seen from the shift matrix that, depending on the combination of the eight shift elements, up to seven gears G1 . . . G6, R can be set, wherein the first gear G1 has the highest transmission ratio and the sixth gear G6 has the lowest transmission ratio. In gears G1 . . . G6, R, there is in each case preferably a fixed speed ratio corresponding to the transmission ratio indicated in the last column between the first drive unit 7 and the output shaft 11. In gears G1 . . . G6, R, the output shaft is driven either by the first drive unit 7 alone or together with the second drive unit 8. In particular, these are internal combustion or hybrid gears, for example if the first drive unit 7 is an internal combustion engine and the second drive unit 8 is an electric machine. These gears also make it possible to increase the load point of the internal combustion engine, thus enabling the electric machine to be operated as a generator, and a battery to be charged during operation, in particular driving operation of a vehicle. There follow in the subsequent rows of the matrix the five gears E1, E2, E3, E4, E5 or operating modes in which only the second drive unit is connected to the output shaft 11. For this purpose, it is necessary, in particular, for the first and fourth shift elements SE1, SE4 to be open so that there is no connection to the first drive unit. These are, in particular, electric motor gears, e.g. if the second drive unit is an electric machine. In these gears, a vehicle can advantageously be operated locally in a manner free of emissions.

A further mode CH, or stationary charging, is obtained when the second and fourth shift elements SE2, SE4 are closed and all the other shift elements are open. Here, the drive units 7 and 8 are coupled to one another, and there is no connection to the output shaft 11. In this operating mode, while the output shaft, in particular that of a vehicle, is stationary, the second drive unit 8 can be driven by means of the first drive unit 7, for example can be used as a generator to charge an electrical energy source 70, in particular a battery. Alternatively, it is also possible for the first drive unit 7 to be driven by means of the second drive unit 8 and, for example, for an internal-combustion engine start or a diagnosis of the internal combustion engine to be carried out if the first drive unit 7 is an internal combustion engine and the second drive unit 8 is an electric machine.

Figure 3:
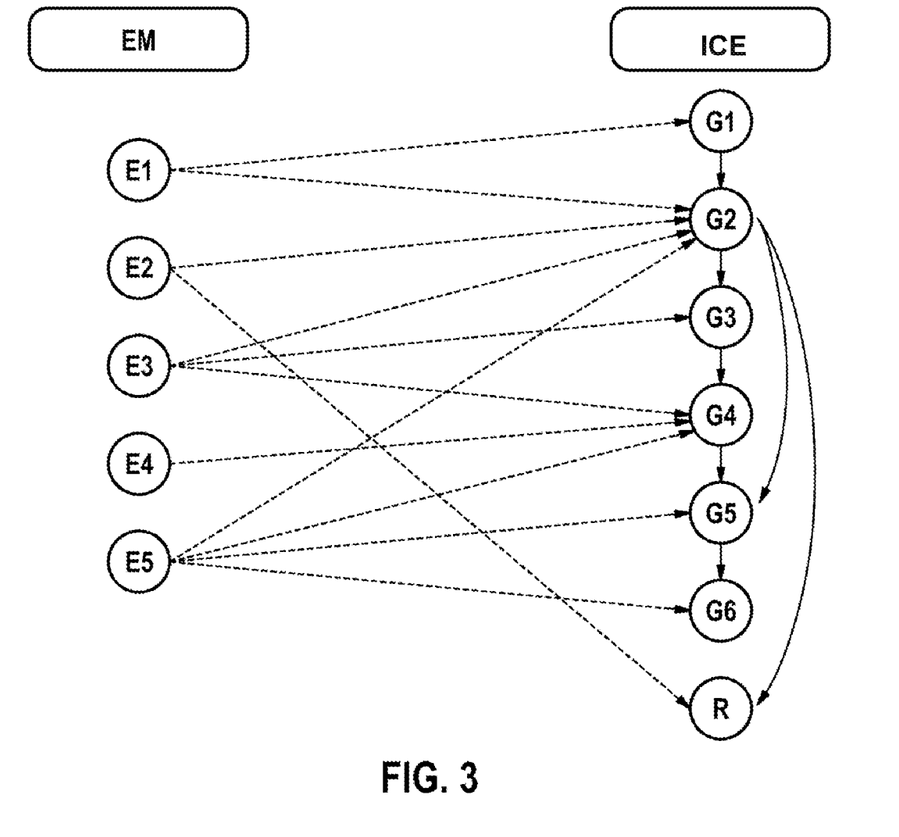
FIG. 3: shows a graphical illustration of the shiftability matrix of the gears that can be selected without any interruption in the tractive effort.

FIG. 3 shows a graphical illustration of the shiftability matrix of the gears that can be selected. The electric-motor gears E1 . . . E5 are illustrated on the left-hand side, and the seven internal combustion engine gears G1 . . . G6, R are illustrated on the right-hand side. In this case, the solid arrow symbolizes transitions between two gears without any interruption in the tractive effort, and the dashed arrow symbolizes selectable transitions between two gears. Thus, in the internal combustion engine gears G1 to R, it is always possible to shift into the next higher gear. Furthermore, it is possible to change from the second gear G2 into the fifth gear G5 and into the seventh gear R without any interruption in the tractive effort. The seventh gear R is a reverse gear.

Furthermore, the internal combustion engine can be started in the first gear G1 and in the second gear G2 from the electric-motor first gear E1. Furthermore, the internal combustion engine can be started in the second gear G2 and in the seventh gear R from the electric-motor second gear E2. The internal combustion engine can be started in the second gear G2, in the third gear G3 and in the fourth gear G4 from the electric-motor third gear E3. It is possible to start the internal combustion engine in the fourth gear G4 from the fourth electric-motor gear E4. Furthermore, the internal combustion engine can be started in the second, fourth, fifth and sixth gears G2, G4, G5, G6 from the fifth electric-motor gear E5.

Figure 4:
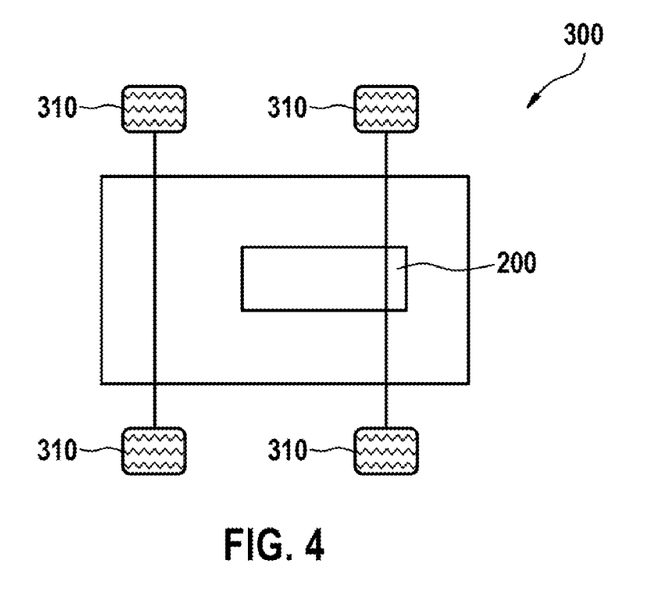
FIG. 4: shows a schematically illustrated vehicle having a hybrid drive train assembly.

FIG. 4 shows a vehicle 300 with wheels 310, wherein the vehicle comprises a hybrid drive assembly 200 as described above.

Figure 5:
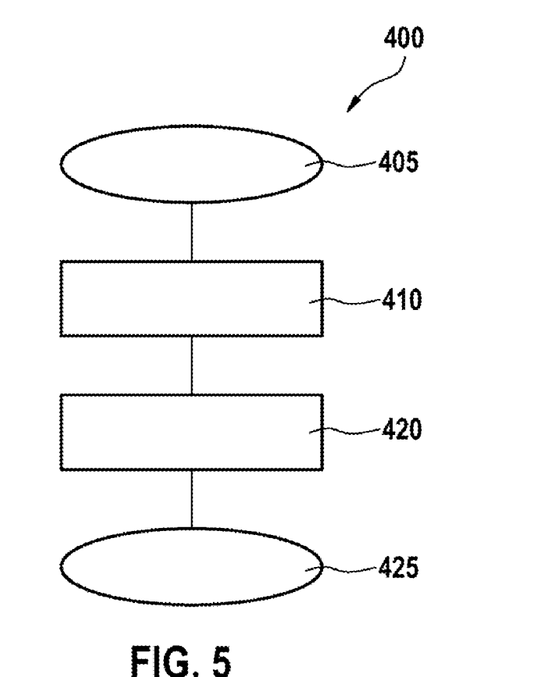
FIG. 5: shows a schematically illustrated method for operating a hybrid drive train assembly.

FIG. 5 shows a flowchart of a method 400 for operating a hybrid drive assembly 200 having a transmission 100. The method starts with step 405. In step 410, an operating input signal BV is determined and, in step 420, at least one of the shift elements SE1 . . . SE8 is actuated to set the functionality of the transmission 100 in accordance with the operating input signal BV. The method ends with step 425. In this context, the operating input signal BV is either a parameter for a physical variable in the transmission 100, such as, for example, a torque or a rotational speed, or a power to be transmitted, which is to be applied or transmitted to a component of the transmission 100. These components are, in particular, the input shaft 10, the output shaft 11 but also the parameters at the drive units 7, 8 or the shift elements SE1 . . . SE8. In addition, the operating input signal BV can also represent a specific operating mode, such as one of the seven gears G1 . . . G6, R or of the five gears E1 . . . E5 which are operated only with the second drive unit, or else stationary charging CH. In accordance with this operating input signal BV, the shift elements SE1 to SE8 are controlled in accordance with the shift matrix in order to shift the transmission 100 into the corresponding gear or operating mode. To achieve a changeover between the individual gears or operating modes without any interruption in the tractive effort, it is necessary for one of the shift elements SE1 . . . SE8 to maintain its state before and after the shift, with a further shift element changing over from the open state to the closed state during the shift, while another shift element changes over from the closed state to the open state.

The invention claimed is:

1. A transmission for a hybrid drive assembly, said transmission being couplable to two drive units, the transmission comprising:
   an input shaft;
   an output shaft;
   at least one first transmission shaft;
   a second transmission shaft;
   a third transmission shaft;
   at least one first shift element configured to couple the input shaft to the at least one first transmission shaft;
   at least one second shift element;
   at least one third shift element;
   at least one first spur gear set to which the at least one first transmission shaft is coupled, the at least one first spur gear set configured to be coupled to the second transmission shaft by the at least one second shift element;
   at least one second spur gear set to which the second transmission shaft is coupled, the at least one second spur gear set being coupled to the third transmission shaft;
   at least one third spur gear set to which the third transmission shaft is coupled, the at least one third spur gear set configured to be coupled to the output shaft by the at least one third shift element;
   a fourth spur gear set coupled to the output shaft; and
   a seventh shift element configured to selectively disconnect the first spur gear set from, and connect the first spur gear set to, the fourth spur gear set.

2. The transmission according to claim 1, further comprising:
   a fourth shift element configured to selectively disconnect the input shaft from, and connect the input shaft to, the third transmission shaft.

3. The transmission as claimed in claim 1, further comprising:
   a fifth shift element configured to selectively disconnect the at least one first spur gear set from, and connect the first spur gear set to, the output shaft.

4. The transmission as claimed in claim 1, further comprising:
   a sixth shift element configured to selectively disconnect the second transmission shaft from, and connect the second transmission shaft to, the output shaft.

5. The transmission as claimed in claim 1, further comprising:
   a fifth spur gear set coupled to the second transmission shaft; and
   an eighth shift element configured to selectively disconnect the first spur gear set from, and connect the first spur gear set to, the fifth spur gear set.

6. The transmission as claimed in claim 1, wherein (i) the first shift element comprises a clutch, and (ii) the second and/or the third shift element comprises a claw clutch or a friction clutch.

7. The transmission as claimed in claim 1, wherein the input shaft is configured to be coupled to a first drive unit of the two drive units, and the first spur gear set or the first transmission shaft is configured to be coupled to a second drive unit of the two drive units.

8. The transmission as claimed in claim 1, wherein the transmission is configured such that transmission ratios of the transmission are changed without any interruption in tractive effort.

9. The transmission as claimed in claim 1, further comprising:
   a controller configured to control at least one of the first, second, and third shift elements in accordance with a specified operating input signal.

10. A hybrid drive assembly comprising the transmission of claim 1.

11. A vehicle comprising:
   the hybrid drive assembly as claimed in claim 10.

12. The hybrid drive assembly of claim 10, further comprising:

a first drive, a second drive unit and/or a pulse inverter, and/or an electrical energy source to which the transmission is couplable.

13. A method for operating a hybrid drive assembly having a transmission that includes an input shaft; an output shaft; at least one first transmission shaft; a second transmission shaft; a third transmission shaft; at least one first shift element configured to couple the input shaft to the at least one first transmission shaft; at least one second shift element; at least one third shift element; at least one first spur gear set to which the at least one first transmission shaft is coupled, the at least one first spur gear set configured to be coupled to the second transmission shaft by the at least one second shift element; at least one second spur gear set to which the second transmission shaft is coupled, the at least one second spur gear set being coupled to the third transmission shaft; at least one third spur gear set to which the third transmission shaft is coupled, the at least one third spur gear set configured to be coupled to the output shaft by the at least one third shift element; a fourth spur gear set coupled to the output shaft; and a seventh shift element configured to selectively disconnect the first spur gear set from, and connect the first spur gear set to, the fourth spur gear set, the method comprising:
determining an operating input signal; and
controlling at least one of the first, second, and third shift elements to set a functionality of the transmission in accordance with the operating input signal.

14. A computer program configured to execute the method as claimed in claim 13.

15. A machine-readable storage medium, on which the computer program as claimed in claim 14 is stored.

16. A transmission for a hybrid drive assembly, said transmission being couplable to two drive units, the transmission comprising:
an input shaft;
an output shaft;
at least one first transmission shaft;
a second transmission shaft;
a third transmission shaft;
at least one first shift element configured to couple the input shaft to the at least one first transmission shaft;
at least one second shift element;
at least one third shift element;
at least one first spur gear set to which the at least one first transmission shaft is coupled, the at least one first spur gear set configured to be coupled to the second transmission shaft by the at least one second shift element;
at least one second spur gear set to which the second transmission shaft is coupled, the at least one second spur gear set being coupled to the third transmission shaft;
at least one third spur gear set to which the third transmission shaft is coupled, the at least one third spur gear set configured to be coupled to the output shaft by the at least one third shift element;
a fifth spur gear set coupled to the second transmission shaft; and
an eighth shift element configured to selectively disconnect the first spur gear set from, and connect the first spur gear set to, the fifth spur gear set.

17. The transmission according to claim 16, further comprising:
a fourth shift element configured to selectively disconnect the input shaft from, and connect the input shaft to, the third transmission shaft.

18. The transmission as claimed in claim 16, further comprising:
a fifth shift element configured to selectively disconnect the at least one first spur gear set from, and connect the first spur gear set to, the output shaft.

19. The transmission as claimed in claim 16, further comprising:
a sixth shift element configured to selectively disconnect the second transmission shaft from, and connect the second transmission shaft to, the output shaft.

20. The transmission as claimed in claim 16, wherein the input shaft is configured to be coupled to a first drive unit of the two drive units, and the first spur gear set or the first transmission shaft is configured to be coupled to a second drive unit of the two drive units.

* * * * *